(12) United States Patent
Asghari et al.

(10) Patent No.: US 7,646,949 B2
(45) Date of Patent: Jan. 12, 2010

(54) EFFICIENT TRANSFER OF LIGHT SIGNALS BETWEEN OPTICAL DEVICES

(75) Inventors: Mehdi Asghari, San Marino, CA (US); Dazeng Feng, Arcadia, CA (US); Joan Fong, San Marino, CA (US); Daniel C. Lee, Rosemead, CA (US); Hongbing Lei, Monterey Park, CA (US); Bradley Jonathan Luff, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 20 days.

(21) Appl. No.: 11/881,745

(22) Filed: Jul. 27, 2007

(65) Prior Publication Data

US 2009/0129720 A1 May 21, 2009

(51) Int. Cl.
*G02B 6/34* (2006.01)
(52) U.S. Cl. ............................... 385/36; 385/88; 385/89
(58) Field of Classification Search ................... 385/36, 385/88, 89
See application file for complete search history.

(56) References Cited

U.S. PATENT DOCUMENTS

| | | | |
|---|---|---|---|
| 7,391,937 B2 * | 6/2008 | Thorson et al. ............... | 385/14 |
| 2004/0184717 A1 * | 9/2004 | Koontz et al. ............... | 385/18 |
| 2004/0202414 A1 * | 10/2004 | Wong et al. ............... | 385/22 |
| 2005/0041906 A1 * | 2/2005 | Sugama et al. ............... | 385/14 |
| 2006/0018588 A1 | 1/2006 | Uchida | |
| 2006/0056756 A1 | 3/2006 | Uchida | |
| 2006/0126995 A1 | 6/2006 | Glebov et al. | |
| 2007/0160322 A1 * | 7/2007 | Ide et al. ....................... | 385/24 |
| 2007/0183720 A1 * | 8/2007 | Ide et al. ....................... | 385/47 |
| 2007/0269165 A1 * | 11/2007 | Hirose ........................ | 385/50 |

\* cited by examiner

*Primary Examiner*—Ellen Kim
(74) *Attorney, Agent, or Firm*—Gavrilovich, Dodd & Lindsey, LLP

(57) ABSTRACT

An optical device includes a waveguide immobilized on a base. The device includes a port configured to receive light signals from the waveguide such that the light signals travel through the port. The light signals enter the port traveling in a first direction. The port is configured to change the direction of the light signals from the first direction to a second direction that is toward a location above the device or below the device. The device also includes a wedge configured to receive the light signals from the port such that the light signals travel through the wedge and then exit the wedge traveling in a direction that is at an angle in a range of 88° to 92° relative to the device and that is toward a location above or below the device.

31 Claims, 9 Drawing Sheets

EFFICIENT TRANSFER OF LIGHT SIGNALS BETWEEN OPTICAL DEVICES

FIELD

The present invention relates to devices that include waveguides for guiding light signals and particularly, to systems that transfer the light signals from a waveguide on one of the devices to a waveguide on another device.

BACKGROUND

Optical devices that include waveguides for guiding light signals are employed in a variety of industries such as telecommunications. It is often desirable to transfer a light signal carried by a waveguide in one of these devices to a waveguide on another one of these devices. This transfer can be performed by allowing the light signal to travel through free space between devices. For instance, a first waveguides on a first device can terminate at a first port that directs light signals carried in the first waveguide device in a direction toward a location above the device. A second waveguide on the second device can also terminate at a second port configured to receive light signals traveling toward the second device. As a result, the second device can be positioned over the first device so the second port receives light signals that exit the first port on the first device. During operation of the devices, a light signal guided along the first waveguide exits the first device through the first port and travels between the first port and the second port. The light signal is then received at the second port and is then guided along the second waveguide.

The transfer of the light signal between the devices can require precise alignment between the ports on the different devices. Many devices include alignment openings that are used to achieve this alignment. The alignment openings on a device generally extend into a surface of the device. When the devices are aligned, an alignment structure such as a ball is positioned so it spans an alignment opening in each of the devices. For instance, using the above example, an alignment structure such as a ball can span the distance between an alignment opening on the first device and an alignment opening on the second device.

These alignment openings are etched into the devices. Because of non-uniformity in the etching processes, the depth of the alignment openings on different devices is often inconsistent. The depth of these alignment openings can determine the separation between two devices. As a result, the non-uniform depth of these openings can cause inconsistent separation between different pairs of devices. However, the transfer of light signals between the devices is often most efficient when the devices are at a particular separation. As a result, the inconsistent separation of different devices is a source of optical loss in the system.

For the above reasons, there is a need for improved transfer of light signals between optical devices.

SUMMARY

An optical device includes a waveguide immobilized on a base. The device includes a port configured to receive light signals from the waveguide such that the light signals travel through the port. The light signals enter the port traveling in a first direction. The port is configured to change the direction of the light signals from the first direction to a second direction that is toward a location above the device or below the device. The device also includes a wedge configured to receive the light signals from the port such that the light signals travel through the wedge and then exit the wedge traveling in a direction that is toward a location above or below the device and that is at an angle in a range of 88° to 92° relative to the device.

A system includes a first device having a first wedge through which light signals exit the device. The system also includes a second device having a second wedge through which the light signals that exit from the first device enter the second device. The light signals travel from the first device to the second device at a first angle relative to the first device and at a second angle relative to the second device. The first angle is in a range of 88° to 92° and the second angle is in a range of 88° to 92°.

BRIEF DESCRIPTION OF THE FIGURES

FIG. 1A is a topview of the optical device.

FIG. 1B is a cross section of the optical device taken at the line labeled B in FIG. 1A.

FIG. 1C is a cross section of the optical device taken at the line labeled C in FIG. 1A.

FIG. 2A is a topview of the optical device.

FIG. 2B is a cross section of the optical device taken at the line labeled B in FIG. 2A.

FIG. 2C is a cross section of the optical device taken at the line labeled C in FIG. 2A.

DESCRIPTION

Optical devices include a port configured to receive light signals from a waveguide. The light signals enter the port traveling in a first direction. The port includes a reflecting surface that changes the direction of the light signals from the first direction to a second direction that is through a wedge positioned above the optical device. The wedge is configured to change the direction of the light signals such that they exit the wedge traveling in a direction that is substantially perpendicular to the device. The optical device can be operated in reverse. For instance, the wedge can receive a light signal that is approaching the optical device from a direction that is perpendicular to the device. The received light signal travels through the port and enters the waveguide.

A system for transferring light signals between optical devices includes two of the devices arranged such that light signals that exit the wedge on one of the devices enters the wedge on the other device. The devices are arranged so the light signals traveling from one device to the other device are traveling in a direction that is substantially perpendicular to each of the devices. As a result of this substantially perpendicular orientation, the location where the light signals are incident on the reflecting surface in each of the ports does not change in response to changes in the separation between the devices. Changes to this location can be a source of optical loss in the system. Since changes to the separation between the devices do not substantially change where the light signals are incident on these reflecting surfaces, the system is associated with a reduced level of optical loss.

Figure 1A:
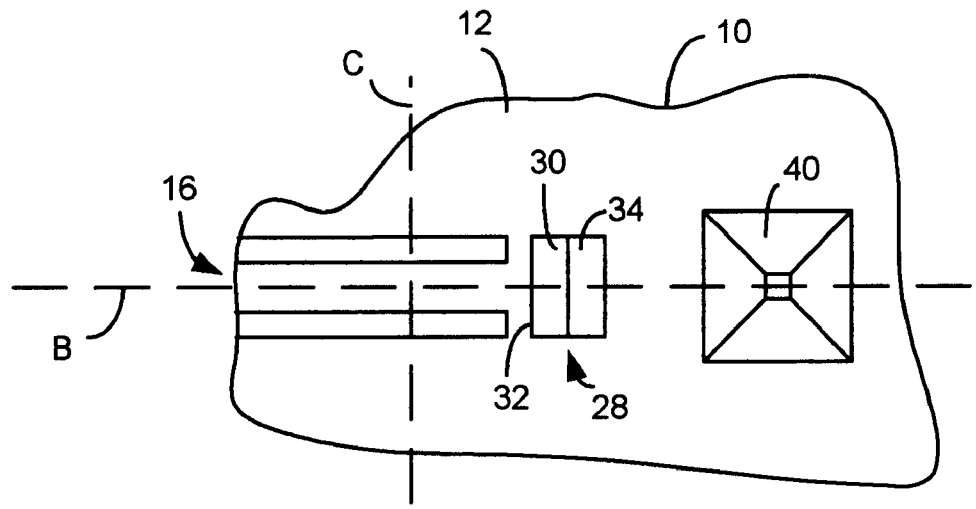
FIG. 1A through FIG. 1C illustrate a portion of an optical device having a port configured to receive light signals from a waveguide. The light signal enters the port traveling in a first direction. The port is configured to change the direction of the light signal from the first direction to a second direction that is toward a location that is above the device.
Figure 1B:
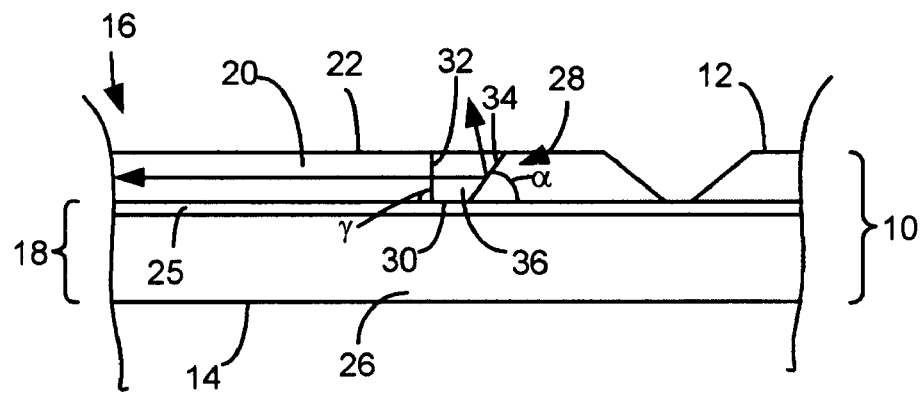
Figure 1C:
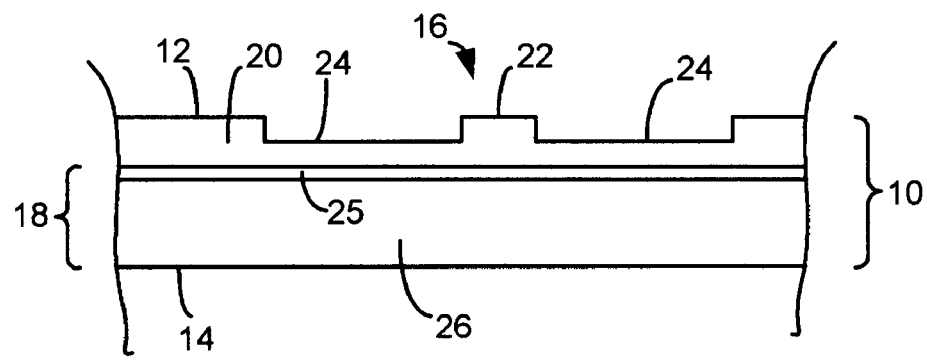

FIG. 1A through FIG. 1C illustrate a portion of an optical device having a port configured to receive light signals from a waveguide. FIG. 1A is a topview of the optical device 10. FIG. 1B is a cross section of the optical device taken at the line labeled B and FIG. 1C is a cross section of the optical device taken at the line labeled C. The device includes lateral sides 10 (or edges) extending from a top side 12 to a bottom side 14. The propagation direction of light signals along the length of the waveguides on a device generally extends through the lateral sides 10 of the device. The nonlateral sides generally include the bottom of the base 18 or substrate. The top side 12 and the bottom side 14 of the device are nonlateral sides.

The optical device includes a waveguide 16 immobilized relative to a base 18. In some instances, the waveguide 16 is immobilized relative to the base 18 or substrate along the length of the waveguide 16. The waveguide 16 is defined in a first light-transmitting medium 20 positioned on the base 18. The first light-transmitting medium 20 includes a ridge 22 defined by trenches 24 extending fully or partially into the first light-transmitting medium 20. Suitable first light-transmitting media include, but are not limited to, silicon, polymers, silica, SiN, GaAs, InP and $LiNbO_3$. The portion of the base 18 adjacent to the first light-transmitting medium 20 includes a medium that reflects light signals from the waveguide 16 back into the waveguide 16 in order to constrain light signals in the waveguide. For instance, the portion of the base 18 adjacent to the first light-transmitting medium 20 can have a lower index of refraction than the first light-transmitting medium 20. The base 18 can include one layer of material or multiple layers of material. For instance, the base 18 can consist of a substrate or can include one or more layers positioned on a substrate. In one example, the device is constructed on silicon-on-insulator wafer. A silicon-on-insulator wafer includes a silicon layer that serves as the first light-transmitting medium 20. The silicon-on-insulator wafer also includes a layer of silica 25 positioned on a silicon substrate 26. The layer of silica 25 and the silicon substrate 26 serve as the base 18.

The device includes a port configured to receive a light signal from the waveguide 16. The port includes a port recess 28 that extends into the first light-transmitting medium 20. The port recess 28 includes one or more sides. The illustrated embodiment includes a bottom side 30 and a plurality of lateral sides including a waveguide side 32 and a reflecting side 34.

A second light-transmitting medium 36 is positioned in the port recess 28. The second light-transmitting medium 36 can be a liquid or a gas and is preferably a solid. The second light-transmitting medium 36 can have a different index of refraction than the first light-transmitting medium 20. Suitable second light transmitting media include, but are not limited to, air, epoxy, polymers, spin-on glasses and evaporated or sputtered films. An example of a suitable polymer is Polyimide PI2611 that is not a substantial source of stress for an optical device constructed on a silicon-on-insulator wafer.

As evident in FIG. 1B, the waveguide side 32 can be positioned at an angle γ measured relative to the base 18 and the reflecting side 34 can be positioned at an angle α measured relative to the base 18. The angle γ can be the same or different from the angle α. A suitable range of angles for γ and/or α includes, but is not limited to, angles in the range from 0° to 90°, and 45° to 90° and angles less than 89°, 87° or 85°. When the first light-transmitting medium 20 is silicon and the port recess 28 is formed by etching, a suitable angle for γ and/or α is about 54.7° since the crystalline structure of the silicon layer causes sides of the port recess 28 to be naturally etched at an angle of about 54.7°. In one example, the angle γ is about 90° and α is about 54.7°.

The device includes an alignment opening 40 extending at least into the first light-transmitting medium 20. As will become evident below, the alignment opening 40 is employed to align the device with another device. The lateral sides of the illustrated alignment opening 40 are slanted such that the cross-sectional area of the alignment opening 40 decreases as the opening progresses further into the device.

During operation of the device, a light signal guided by the waveguide 16 travels to an end of the waveguide 16 and is traveling in the direction of propagation immediately before exiting the waveguide 16. The light signal exits from the waveguide 16 and is received by the port. The light signal travels through the port. For instance, the light signal travels through the waveguide side 32 of the port recess 28 and accordingly enters the port traveling in a first direction. The first direction can be the same or different from the direction of propagation. For instance, if the direction of propagation is not normal to the waveguide side 32 and the second light-transmitting medium 36 has an index of refraction that is different from the first light-transmitting medium 20, there may be some refraction that changes the direction of the light signal upon the light signal entering the second light-transmitting medium. The light signal travels through the second light-transmitting medium 36 to the reflecting surface. The reflecting surface reflects the light signal. The light signal then travels through the second light-transmitting medium 36 and exits the second light-transmitting medium 36. Before exiting from the second light-transmitting medium 36, the light signal is traveling in a second direction. The second direction is toward a location that is over a nonlateral side of the device such as the top side of the device or the bottom side of the device. FIG. 1B illustrates the second direction as being toward a location that is above the device.

Although the operation of the device is described in the context of a light signal traveling from the waveguide 16 and then through the port, the device can be operated in reverse. For instance, the port can receive a light signal from above the device and then reflect the light signal such that the light signal is received and guided by the waveguide 16.

Figure 2A:
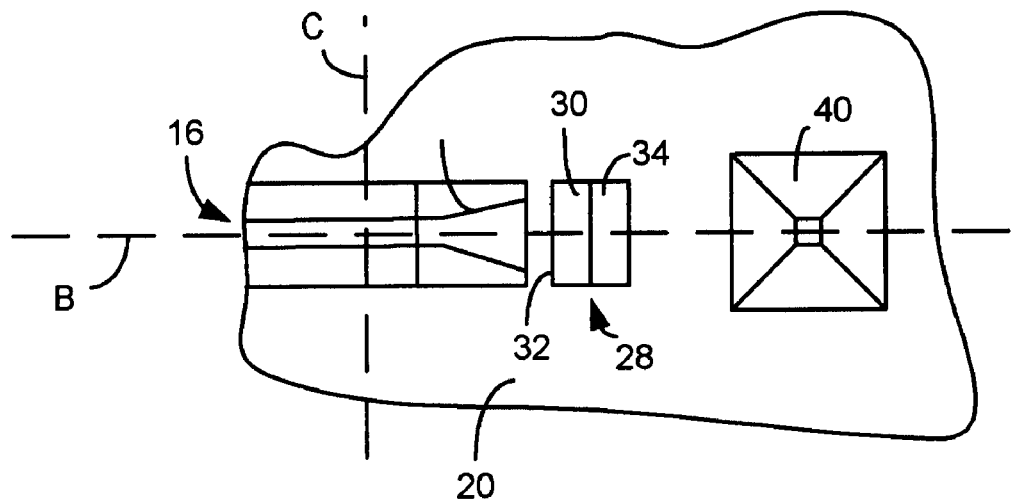
FIG. 2A through FIG. 2C illustrate another embodiment of an optical device having the port configured to receive light signals from a waveguide. The waveguide includes a vertical taper and a horizontal taper.
Figure 2B:
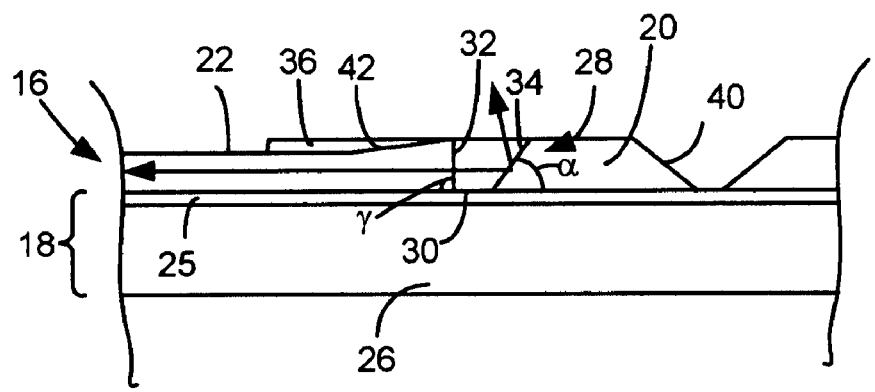
Figure 2C:
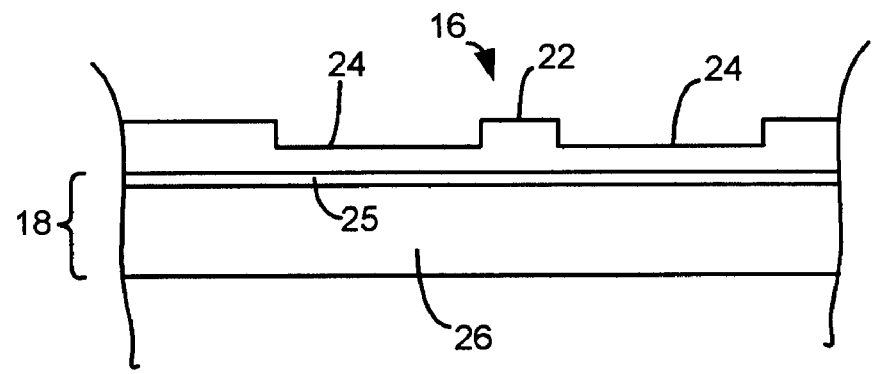

In some instances, the waveguide 16 includes a taper 42 as illustrated in the device of FIG. 2A through FIG. 2C. FIG. 2A is a topview of the optical device. FIG. 2B is a cross section of the optical device taken at the line labeled B and FIG. 2C is a cross section of the optical device taken at the line labeled C. The illustrated waveguide 16 includes a horizontal taper as evident in FIG. 2A and a vertical taper as evident in FIG. 2B, however, the waveguide 16 can include only a horizontal taper or only a vertical taper.

The second light-transmitting medium 36 can be positioned in the port recess 28 and can also optionally be positioned on top of the taper 42 as is evident from FIG. 2A and FIG. 2B. For the purpose of illustration, the second light-transmitting medium is treated as transparent in FIG. 2A to permit viewing of the underlying horizontal taper. As evident in FIG. 2B, the positioning of the second light-transmitting medium 36 over the taper can provide a continuous flat surface over the interface between the waveguide 16 and the port.

The devices illustrated in FIG. 1A through FIG. 2C show only a portion of the device. The remainder of the device can include none, one, or more than one other optical components in addition to the waveguide 16. The waveguide 16 can be in optical communication with these optical components or can be optically isolated from these optical components. Examples of these optical components include, but are not limited to, demultiplexers, multiplexers, filters, switches, amplifiers, attenuators, lasers and other light sources, star couplers, and other waveguides. Additionally or alternatively, the device can include electrical components. For instance, the device can include electrical connections for applying a potential or current to a waveguide and/or for controlling other features on the optical device.

Figure 3:
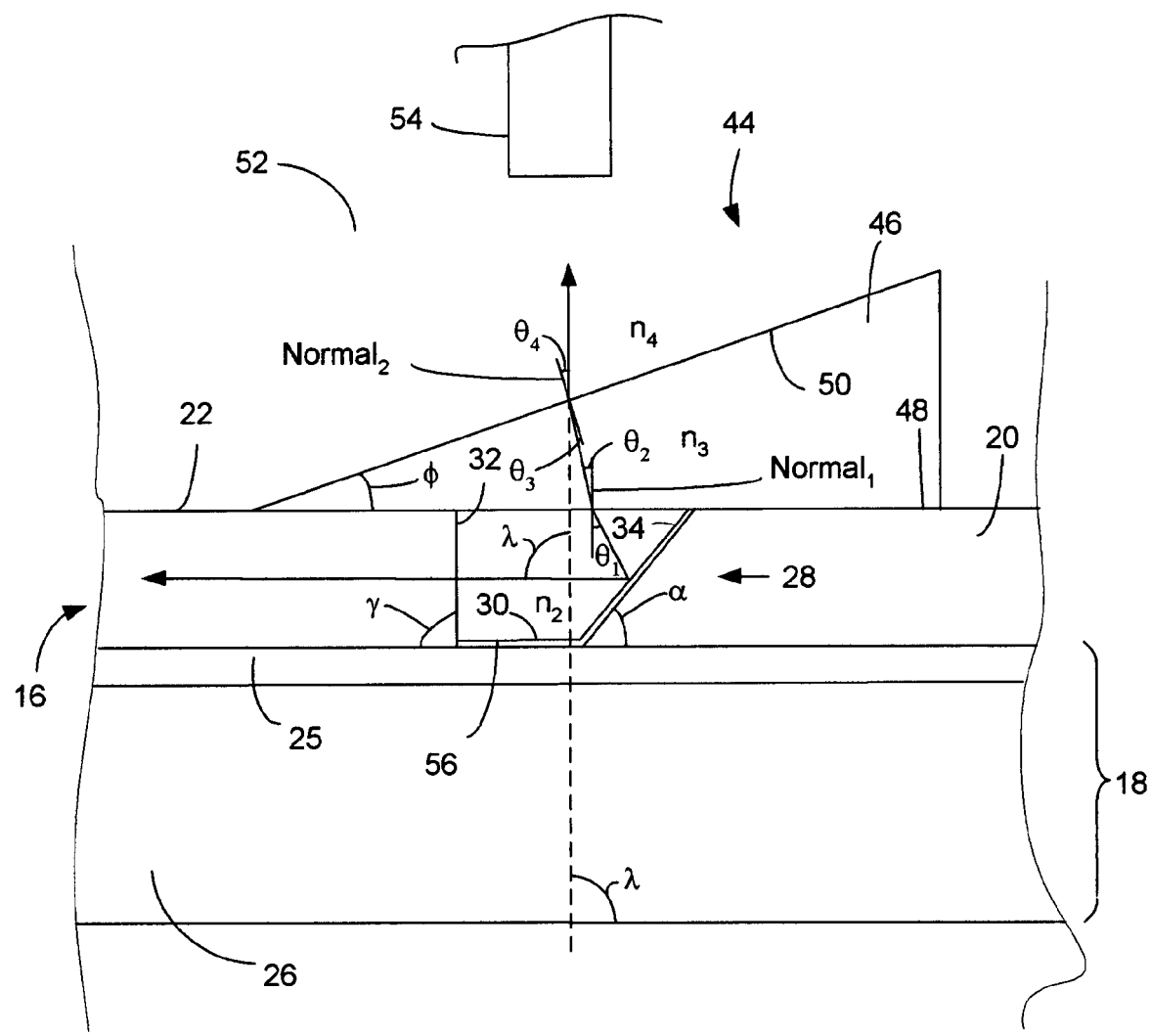
FIG. 3 illustrates a wedge positioned on the optical device of FIG. 1A through FIG. 1C such that the port is between the wedge and the base or substrate. The wedge is positioned so light signals exit the optical device through the wedge traveling in direction that is substantially perpendicular to the device.

FIG. 3 illustrates a wedge 44 positioned on the optical device of FIG. 1A through FIG. 1C. The wedge 44 includes or consists of a third light-transmitting medium 46. The third light-transmitting medium 46 can be the same as the second light-transmitting medium 36 or different from the second light-transmitting medium 46. The wedge 44 includes an interface side 48 and a correction side 50. The wedge 44 is positioned so light signals that exit from the port pass through the interface side 48 of the wedge 44, through the third light-transmitting medium 46 and then exit the wedge 44 through the correction side 50. The light signal enters a fourth light-transmitting medium 52 after passing through the correction side 50.

In some instance, the light signal travels through the fourth light-transmitting medium 46 and enters another apparatus 54. Examples of the other apparatuses 54 include optical fibers, or apparatuses having a waveguide on a substrate. The waveguide can receive the light signal through a facet of the waveguide or the optical fiber can receive the light signal through a facet on the optical fiber. The apparatus 54 can be positioned so the direction of propagation of the light signal through the waveguide or through the optical fiber is substantially perpendicular to the device at the facet of the waveguide or optical fiber and/or is substantially parallel to the direction of the light signal through the fourth light-transmitting medium 46. As will be illustrated below, the apparatus 54 can be an optical device having a port and wedge constructed according to FIG. 3, or an optical device having a waveguide. In some instances, the device is operated in reverse. As a result, the device can receive the light signal from the apparatus.

In FIG. 3, the interface side 48 has a normal labeled "normal$_1$" and the correction side 50 has a normal labeled "normal$_2$." The second light-transmitting medium 36 has an index of refraction labeled $n_2$. The third light-transmitting medium 46 has an index of refraction labeled $n_3$. The fourth light-transmitting medium 52 has an index of refraction labeled $n_4$.

During operation of the device, the light signal exits the second light-transmitting medium 36 at an angle $\theta_1$ relative to normal$_1$. The light signal enters the third light-transmitting medium 46 at an angle $\theta_2$ relative to normal$_1$. The light signal approaches the correction side 50 at an angle $\theta_2$ relative to normal$_2$. The light signal exits the third light-transmitting medium 46 at an angle $\theta_4$ relative to normal$_1$.

The wedge 44 is configured such that the light signal exits the correction side 50 traveling in a direction that is substantially perpendicular to the plane of the device. For instance, the light signal exits the correction side 50 traveling in a direction that is substantially perpendicular to a side of the base 18 or to a side of a substrate and/or is parallel to normal$_1$. As an example, the light signal exits the correction side 50 traveling in a direction that is at an angle $\lambda$ in a range of 88-92° measured relative to the top side of the base 18, the bottom side of the base 18, the top side of the substrate, and/or the bottom side of the substrate; or in a range of 89-91° measured relative to the top side of the base 18, the bottom side of the base 18, the top side of the substrate, and/or the bottom side of the substrate; or in a range of 89.5-90.5° measured relative to the top side of the base 18, the bottom side of the base 18, the top side of the substrate, and/or the bottom side of the substrate. Additionally or alternatively, the wedge 44 is configured such that the light signal exits the correction side 50 traveling in a direction that is toward a location above the device and is also substantially perpendicular to a direction of propagation of light signals through the waveguide 16. As an example, the light signal exits the correction side 50 traveling in a direction that is toward a location above the device and is also at an angle $\lambda$ in a range of 88-92° measured relative to a direction of propagation the light signals through the waveguide; or in a range of 89-91° measured relative to a direction of propagation the light signals through the waveguide; or in a range of 89.5-90.5° 88-92° measured relative to a direction of propagation the light signals through the waveguide. For the purposes of illustration, FIG. 3 illustrates the angle $\lambda$ measured relative to the bottom of the base 18 or substrate and also relative to the direction of propagation.

The geometry for the wedge 44 can be approximated from the principles of physics. For instance, $n_2$, $n_3$, $\theta_1$ and $\theta_2$ are related by Snell's law. Additionally, $n_3$, $n_4$, $\theta_3$ and $\theta_4$ are also related by Snell's law. The principles of geometry combined with these relationships shows that the angle $\phi$ of the interface side 48 relative to the correction side 50 can be approximated from $$\tan\phi = \frac{-n_2\cos 2\alpha}{\sqrt{n_3^2 - n_2^2\cos^2 2\alpha} - n_4}.$$

Suitable materials for the third light-transmitting medium 46 include, but are not limited to, silica, silicon nitride and silicon. In many instances, it may be desirable for the third light-transmitting medium 46 to have a higher index of refraction than the second light-transmitting medium ($n_3 > n_2$). This relationship can result in a lower value of angle φ. Suitable materials for the fourth light-transmitting medium include, but are not limited to, solids, liquids, or gasses such as air, silica or polymers.

The port recess 28 includes an optional reflecting medium 56 to enhance reflection of the light signal in the port recess 28. FIG. 3 shows the reflecting medium 56 on the bottom side 30 and on the reflecting side 34. The reflecting medium 56 can be positioned on the entire bottom side 30 or a part of the bottom side 30. Additionally or alternately, the reflecting medium 56 can be positioned on the entire reflecting side 34 or on a part of the reflecting side 34. Suitable reflecting media include, but are not limited to, reflective metals such as Al and Au.

Figure 4:
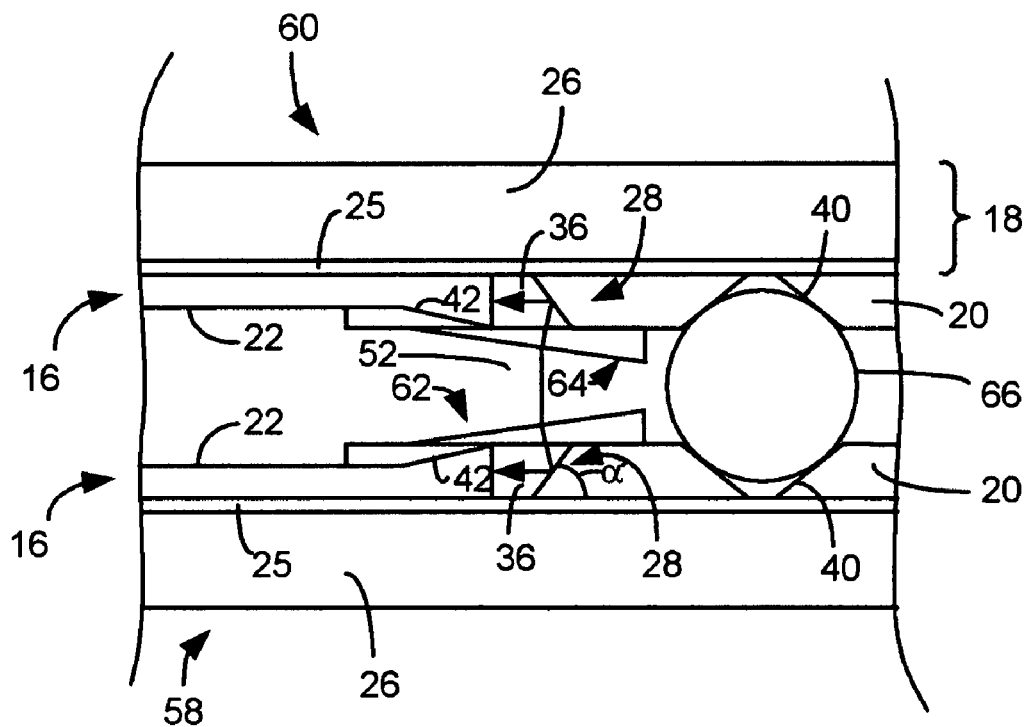
FIG. 4 illustrates a system for transferring a light signal between a first device and a second device. Each device includes a wedge constructed according to FIG. 3. Alignment devices and alignment structures align the first device and the second device in a substantially parallel orientation and such that a light signal that exits from the first device through the wedge on the first device is received by the wedge on the second device and then travels through the wedge on the second device, through a port on the second device, and into a waveguide on the second device.

FIG. 4 illustrates a system configured to transfer a light signal between two different devices that are each constructed according to FIG. 2A through FIG. 2C. The system includes a first device 58 and a second device 60. The first device 58 and the second device 60 each includes a wedge constructed according to FIG. 3. Accordingly, the first device 58 includes a first wedge 62 that causes light signals that exit from the waveguide 16 on the first device 58 to travel in a direction that is substantially perpendicular to the first device 58. The second device 60 includes a second wedge 64 configured to receive light signals approaching the second device 60 from substantially perpendicular to the second device 60 and to guide the light signals through a port on the second device 60 such that the light signals are received in the waveguide 16 on the second device 60.

The light signals travel through the fourth light-transmitting medium 52 when traveling between the first device 58 and the second device 60. In some instances, the fourth light-transmitting medium 52 is the ambient atmosphere in which the first device 58 and the second device 60 are both positioned. For instance, the system can exclude a light guide such as an optical fiber or waveguide that carries the light signals between the first device 58 and the second device 60. In these instances, the light signals are traveling through a free space region between the first device 58 and the second device 60.

The first device 58 and the second device 60 may each include an alignment opening 40 extending into each device. An alignment structure 66 is positioned in the alignment opening 40 on each device such that the alignment structure 66 spans the alignment openings 40. In this case, the alignment structure 66 is a ball, however, other alignment structures 66 can be employed. Since the alignment structure 66 spans the alignment openings 40, the alignment structure 66 serves as a spacer between the devices. The system can include additional alignment structures 66 acting as spacers between alignment openings 40 on the devices. Accordingly, alignment devices can hold the first device 58 and the second device 60 in a substantially parallel orientation. Additionally, the alignment openings 40 are positioned such that the light signals that exit from the first device 58 are received by the second wedge such that the light signals travel through the second wedge, the port on the second device 60 and enter the waveguide 16 on the second device 60. Additionally or alternately, the system can be operated in reverse so the light signals that exit from the second device 60 are received by the first wedge such that the light signals travel through the first wedge, then through the port on the first device 58 and enter the waveguide 16 on the first device 58.

As is evident from the above discussion and FIG. 4, the light signals travel between the first device 58 and the second device 60 in a direction that is substantially perpendicular to the first device 58 and also substantially perpendicular to the second device 60. As a result, variations in the separation between the devices from one system to another system do not substantially affect the location where the light signals are incident on the reflecting side 34 of the ports. In contrast, when the light signals travel between the devices at substantially non-perpendicular angles to the devices, changes in the separation of the devices would change where the light signals hit the reflecting side 34 of the ports. Changing where the light signals hit the reflecting side 34 in a port would cause optical loss. However, since the location where the light signals are incident on the reflecting sides 34 of the current system does not substantially change in response to changes in the separation of the devices, variations in this separation are not a substantial source of optical loss in the system. Because the inconsistencies in etching the alignment openings 40 are often a source of the variation in the separation of the optical devices, the system does not experience substantial optical loss as a result of these inconsistencies.

Figure 5:
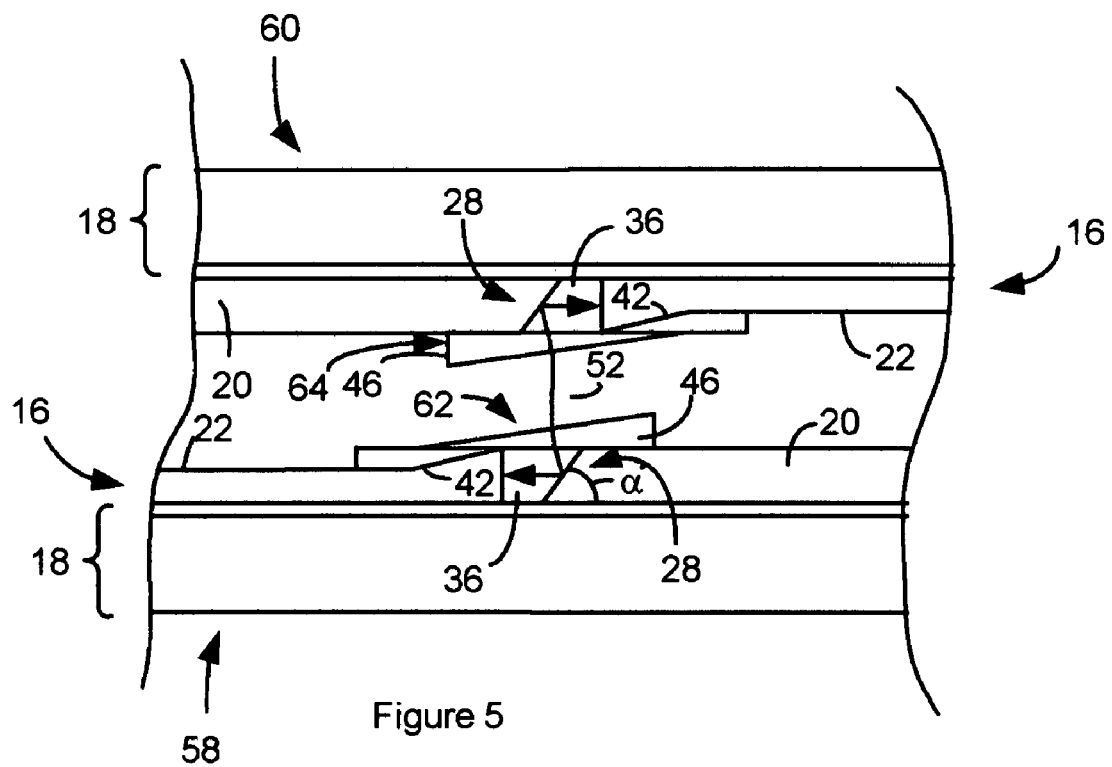
FIG. 5 illustrates a system according to FIG. 4 where the waveguides on the first device has an orientation that is the opposite of the waveguides on the second device.

The substantially perpendicular direction of the light signals relative to the devices when traveling between the devices can increase the flexibility of the waveguide orientations on different devices. For instance, FIG. 5 illustrates a system where the waveguides 16 on the different devices have the opposite orientation. For instance, the waveguide 16 on the first device 58 extends from the port to the left while the waveguide 16 on the second device 60 extends from the port to the right. Alternately, the waveguides 16 in FIG. 4 are shown as having the same orientation. Particularly, the waveguides 16 each extend from the port to the left on the page. In contrast, when the light signals travel toward a device in a direction that is not perpendicular to device, the reflecting side 34 often must have a particular orientation relative to an incoming light signal in order to accurately reflect the light signals into the waveguide 16. The limited orientation of the reflecting surface can also limit the possible orientation of the waveguide 16 on the device. As a result, the presence of the wedges can increase the variations of waveguide orientation.

The first device 58 and the second device 60 shown in FIG. 4 can be the same or different. For instance, the first device 58 can include a selection of optical components that are different from the selection of optical components on the second device 60 or the first device 58 and the second device 60 can include the same selection of optical components. The port, wedge and waveguide constructions on the first device 58 and the second device 60 can be the same or different. For instance, the second light-transmitting medium 36 in the port on the first device 58 can be the same or different from the second light-transmitting medium 36 in the port on the second device 60. Additionally or alternatively, the first wedge and the second wedge can have the same angle φ or a different angle φ and/or the same third light-transmitting media or different third light-transmitting media.

Although the system shown in FIG. 4 shows two devices that are each constructed according to FIG. 2A through FIG. 2C, the system can be constructed with devices constructed according to FIG. 1A through FIG. 1C.

Figure 6:
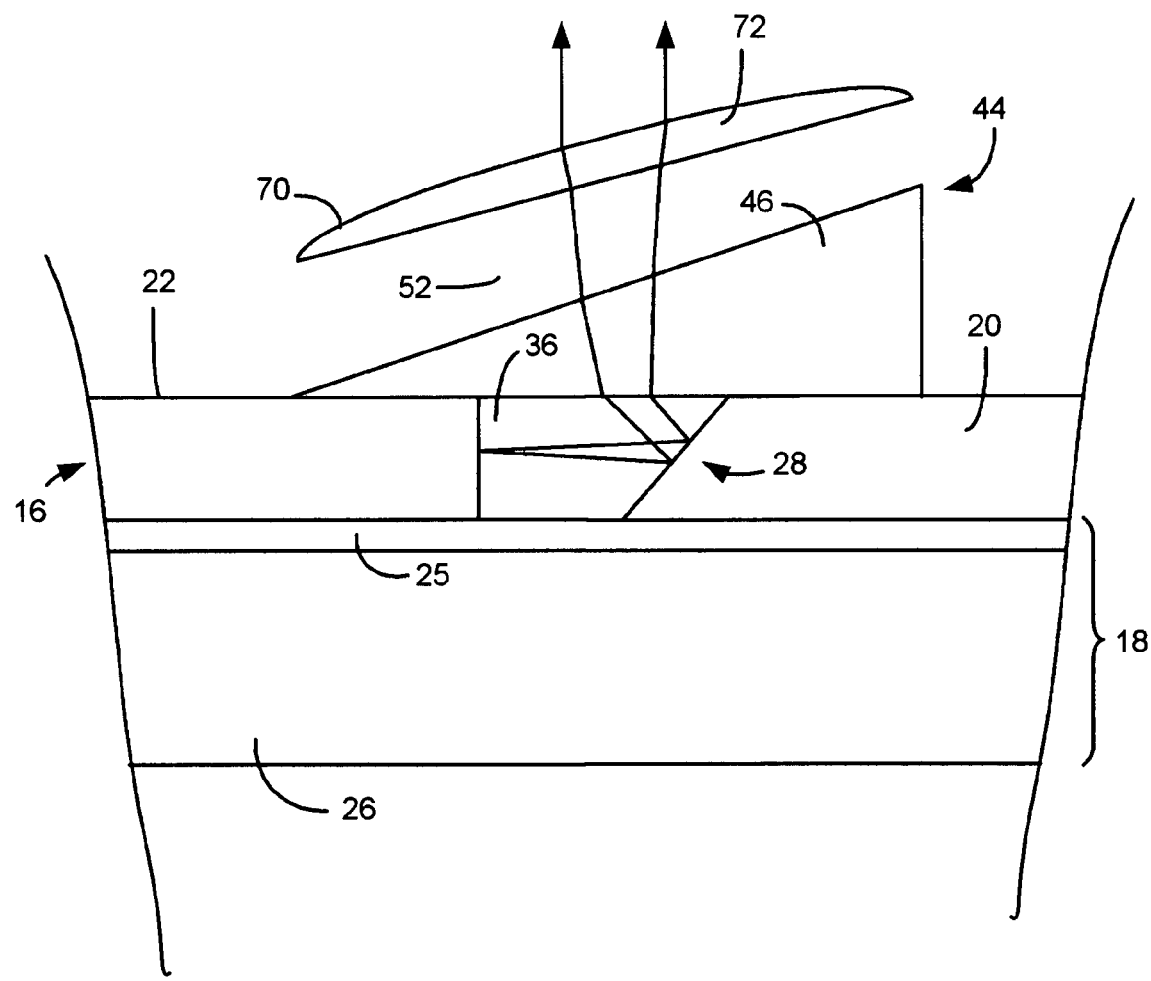
FIG. 6 illustrates a lens used in conjunction with the device such that the lens receives the light signals from the device. The lens is a one-sided convex lens.

Additional optics can be employed in conjunction with the device or with the system. For instance, FIG. 6 illustrates the light signals that exit from the wedge being received at a convex lens 70. The lens 70 can be configured to correct the light signal for diffraction. For instance, the lens 70 can be configured to effectively collimate the light signals that exit from the device. The lens 70 can be configured to correct other optical effects such as chromatic aberration. The lens 70 can include or consist of a fifth light-transmitting medium 72.

The index of refraction for the fifth light-transmitting medium 72 can be the same or different from the index of refraction for the third light-transmitting medium 46.

Figure 7:
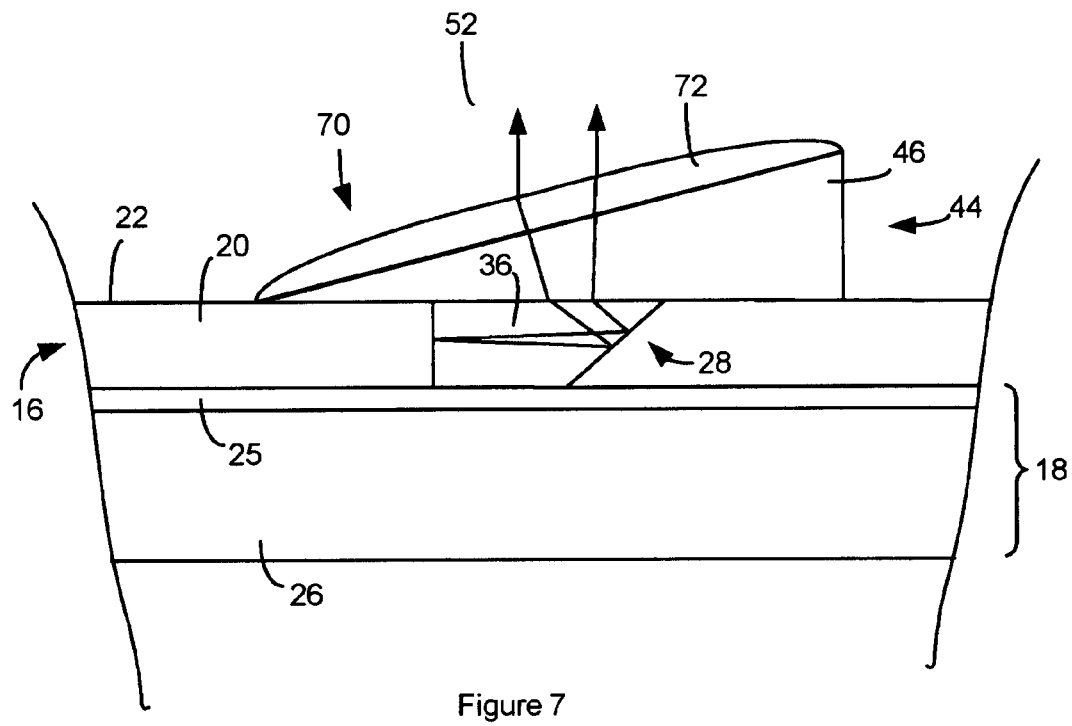
FIG. 7 illustrates the lens of FIG. 6 placed in contact with a wedge included in an optical device and constructed according to FIG. 3.
Figure 8:
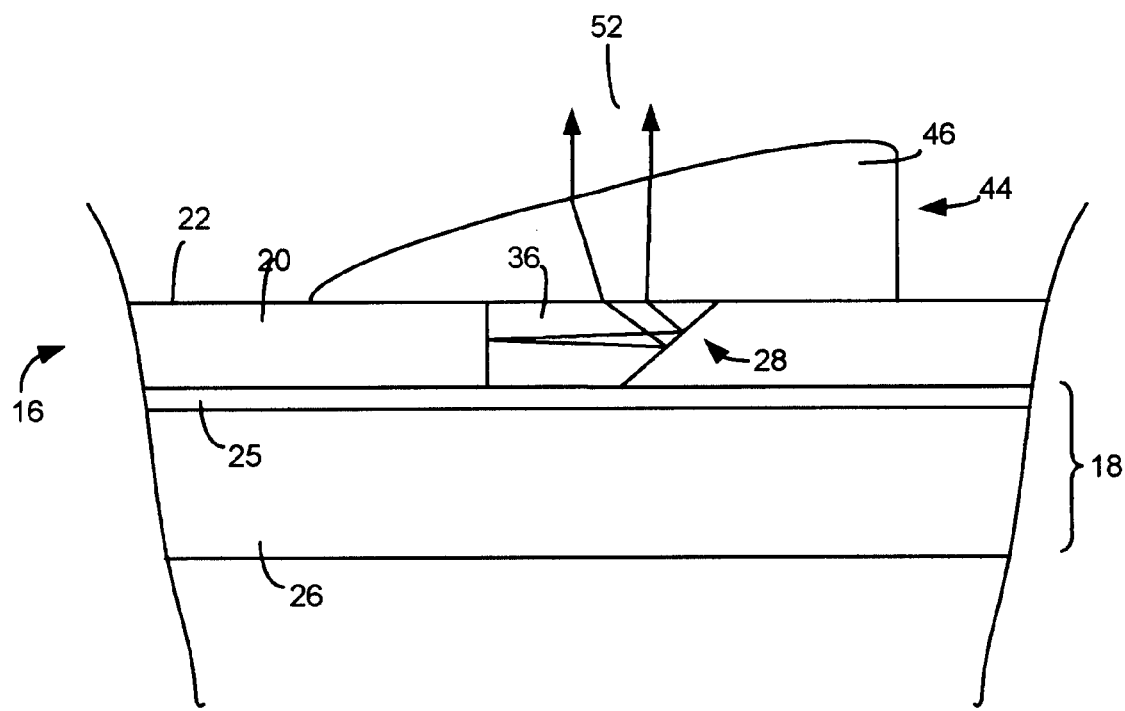
FIG. 8 illustrates the lens of FIG. 7 incorporated into the wedge of FIG. 7.

The lens 70 need not be spaced apart from the wedge. For instance, the wedge can be in contact with the lens 70 as shown in FIG. 7. Alternately, the lens can be integrated into the wedge as illustrated in FIG. 8. As a result, the wedge can have a correction side 50 that is substantially flat or curved.

Figure 9:
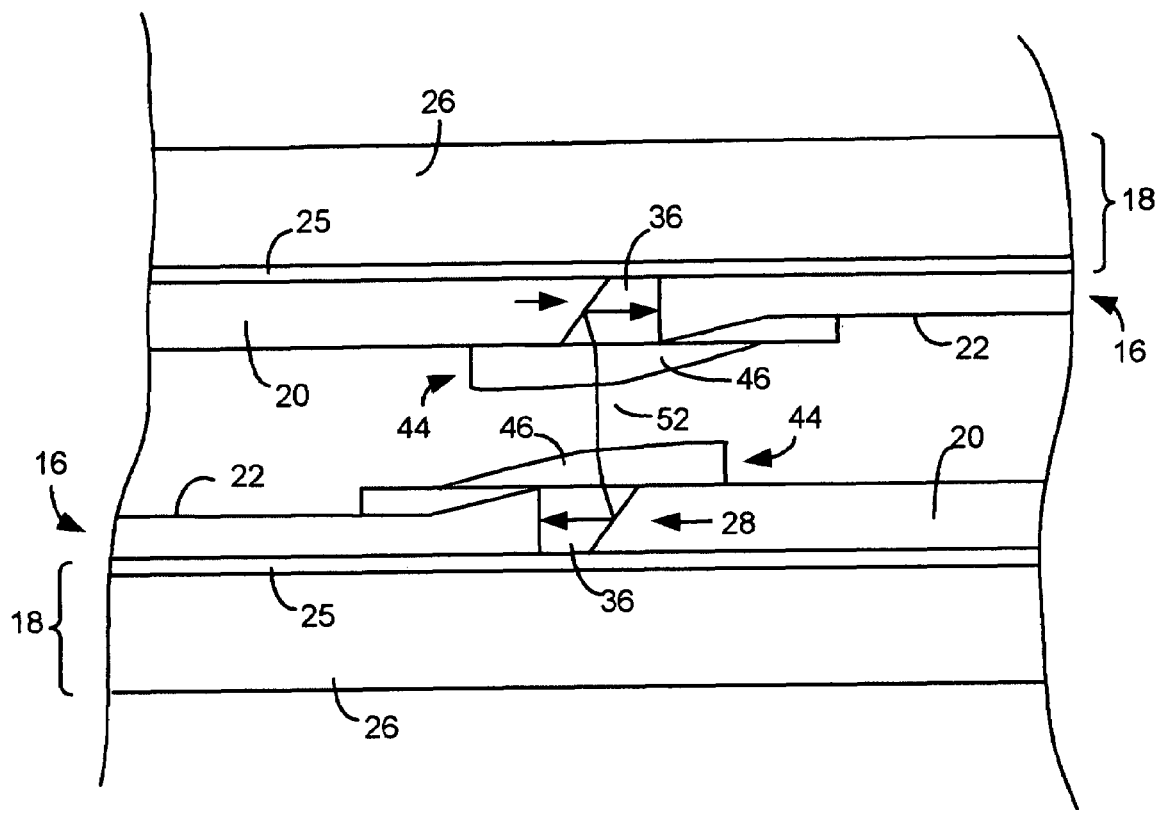
FIG. 9 illustrates a system for transfer of light signals from a first device to a second device. The devices each include a wedge constructed according to FIG. 8.

When the device is included in a system where a light signal is transferred between a first device and a second device, one or two of the lenses can be position in the path of the light signals. For instance, FIG. 9 illustrates an example of the system where the lens is incorporated into the wedge on each of the devices. Accordingly, the light signals experience two lenses when being transferred between the devices. The lens on each of the devices can be the same or different. Additionally, the lenses can correct for the same selection of optical effects or for a different selection of optical effects. For instance, each of the lenses can be configured to correct for the same degree of diffraction. As a result, the light signals are corrected for diffraction only as they travel between the devices. For instance, the lens on the first device can correct for diffraction and the lens on the second diffraction can reverse the correction performed by the lens on the first device. As a result of the correction followed by the correction reversal, the light signals enter the waveguide 16 on the second device in a state that approximates the state at which the light signals exited from the waveguide 16 on the first device.

Figure 10:
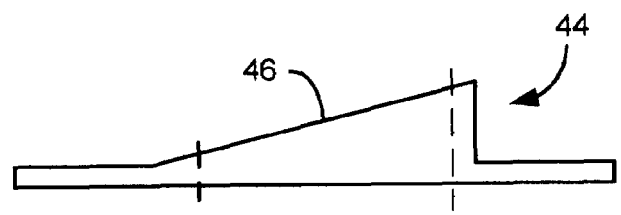
FIG. 10 illustrates a wedge having an interface side that does not meet a correction side. Light signals travel between the interface side and the correction side during operation of a device that includes the wedge.

Although the above illustrations show the wedge constructed such that the interface side 48 and the correction side 50 meet, other wedge constructions are possible. For instance, FIG. 10 is a cross-section of a wedge where the interface side 48 does not intersect the correction side 50. Alternately, a wedge can be cropped along the dashed lines shown in FIG. 10.

Although the devices are described in the context of the wedge being in contact with the second light-transmitting medium 36, the wedge need not contact the second light-transmitting medium 36. For instance, there can be a solid, liquid or gas such as air between the wedge and the second light-transmitting medium 36.

FIG. 11A through FIG. 11E illustrate a method of forming a device having tapered waveguides constructed according to FIG. 2A through 2C. The method is illustrated using a wafer having a first light-transmitting medium 20 positioned on a base 18. In some instances, the wafer is a silicon-on-insulator wafer.

Figure 11A:
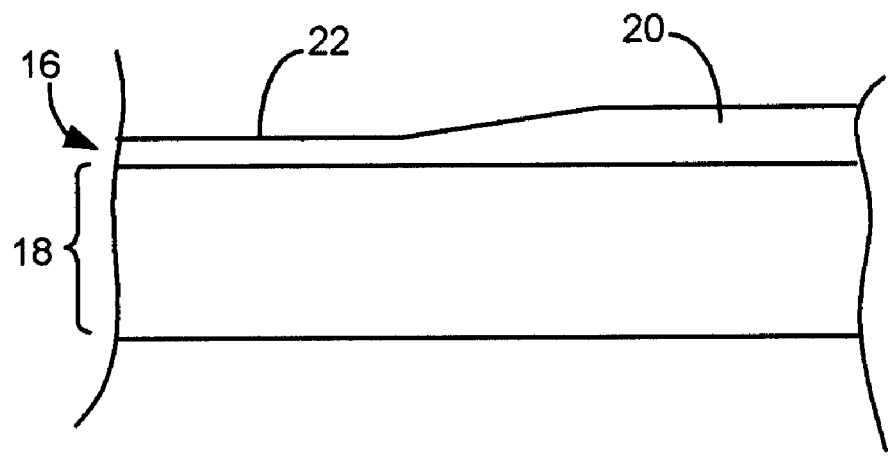
FIG. 11A through FIG. 11E illustrate a method of forming a device having tapered waveguides constructed according to FIG. 2A through 2C.

The tapered waveguide 16 is formed on the device so as to provide the device illustrated in FIG. 11A. A variety of methods are available for forming a tapered ridge 22 waveguide on a device. Example of suitable methods for forming this structure are disclosed in U.S. patent application Ser. No. 10/345,709, filed on Jan. 15, 2003, entitled "Controlled Selectivity Etch for Use with Optical Component Fabrication," issued as U.S. Pat. No. 7,005,247, and incorporated herein in its entirety.

Figure 11B:
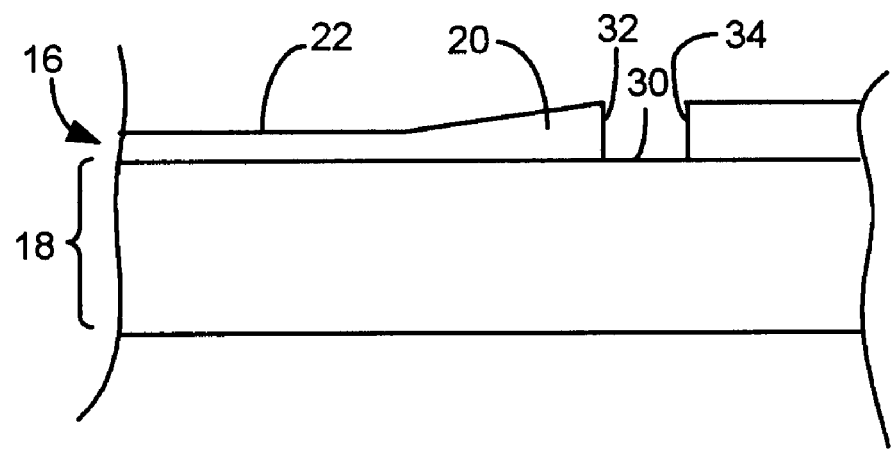

The waveguide side 32 is formed so as to provide the device FIG. 11B. For instance, a photoresist is formed on the device so the region where the bottom of port recess 28 is to be formed remains exposed while the rest of the device is protected. The device is then etched using an etch suitable for facet formation and the photoresist removed to provide the device of 11B.

Figure 11C:
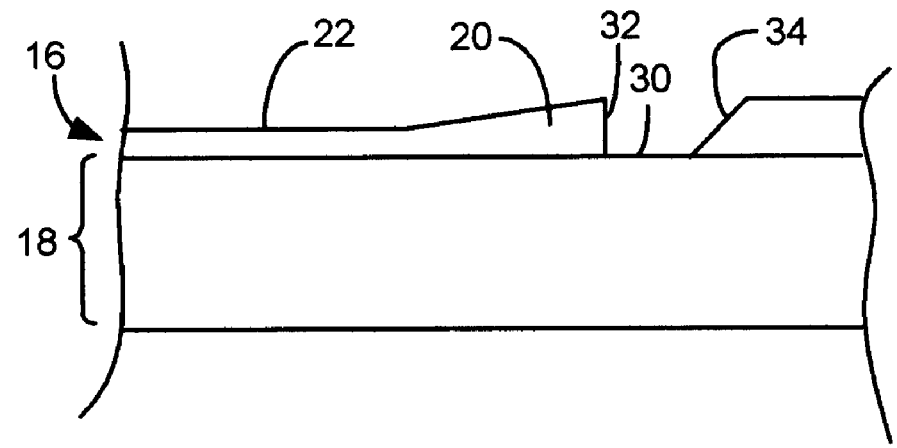

The reflecting side 34 of the port recess 28 is formed so as to provide the device of FIG. 11C. For instance, a photoresist can be formed on the device so as to protect the bottom of the port recess 28 while leaving exposed the region where the reflecting side 34 is to be formed. A wet etch can be performed. When the first light-transmitting medium is silicon, the wet etch can provide the reflecting side 34 with an angle of around 54.7°. The photoresist can then be removed to provide the device of FIG. 11C.

Figure 11D:
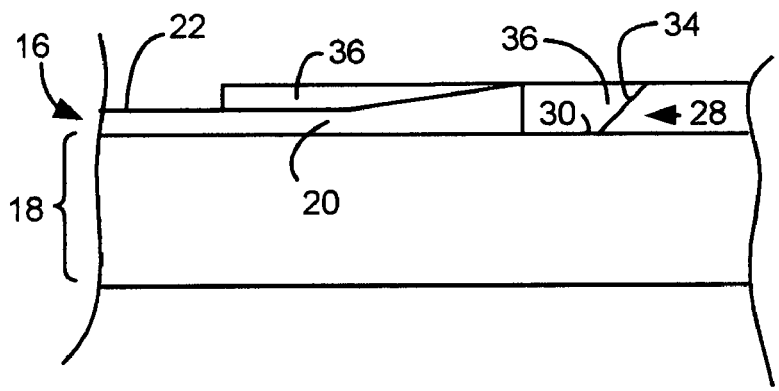

The second light-transmitting medium 36 can be formed on the device so as to provide the device of FIG. 11D. For instance, the second light-transmitting medium 36 can be deposited or grown on the device using techniques such as evaporation, sputtering and spinning. A photoresist is then formed on the device so as to protect the region where the second light-transmitting medium 36 is desired while leaving the rest of the second light-transmitting medium 36 exposed. An etch is performed so as to remove the exposed second light-transmitting medium 36. The photoresist can then be removed to provide the device of FIG. 11D.

The alignment openings 40 are then formed to provide the device of FIG. 2B. For instance, a photoresist can be formed on the device so the regions where the alignment openings 40 are to be formed remain exposed while protecting the remained of the device. A wet etch can be performed. When the first-light-transmitting medium is silicon, the wet etch can provide the sides of the alignment opening 40 with an angle of around 54.7°. The photoresist can then be removed to provide the device of FIG. 2B.

Figure 11E:
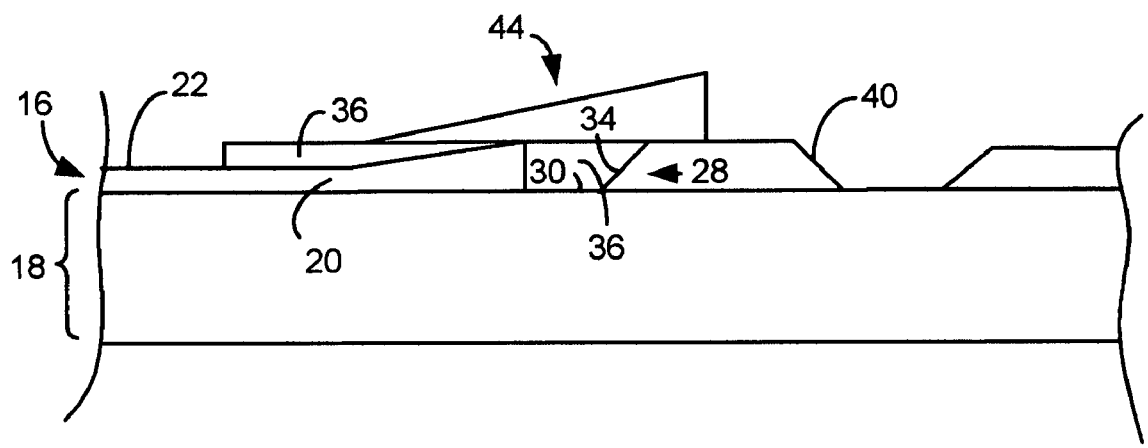

A wedge is then positioned on the device so as to provide the device of FIG. 11E. The wedge can be fabricated by cutting and polishing. The wedge can then be attached to the device using epoxy. Alternatively, the wedge can be fabricated by the etching of deposited material.

Although the system is disclosed in the context of ports that direct light signals to locations above the device, ports are known that direct light signals to locations below a device. The wedge can be employed with these ports to provide light signals that exit the device in a direction that is substantially perpendicular to the device and is also in a direction toward a location under the device.

Although the devices are described as having a light signal that exits from a particular waveguide and then through the wedge, these devices can generally be operated in reverse. For instance, the same device can receive a light signal that travels through the wedge and is received in the waveguide. As a result, the above descriptions are not limited to a particular light signal direction. Additionally, the system can generally be operated in both directions. For instance, a light signal can be transferred from the second device to the first device by operating the system in reverse of a description where the light signal is transferred from the first device to the second device.

The device and system above is often disclosed above using directional terms such as above and below. These terms do not indicate a particular location in space that does not change with changes in the orientation of the device. Instead, these terms are measured relative to the device. For instance, when a device is "right side up" and the device produces light signals that travel toward a location above the device, the device is between a location and the floor. However, when the device is then inverted, the location above the device is between the floor and the device. As a result, a location above the device or below the device moves in space as the spatial orientation of the device changes. Accordingly, locations above the device and below the device are distinguishable from locations over the edges of the device or over the later sides of the device.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
   a waveguide immobilized on a base and terminating at a facet,
      the waveguide guiding light signals such that they exit the waveguide through the facet,
      upon the light signals being incident on the facet the light signals traveling in a direction that is parallel to a direction of propagation of light signals in the waveguide;
   a port configured to receive the light signals from the waveguide such that the light signals travel through the port,
   the light signals entering the port traveling in a first direction and the port being configured to change the direction of the light signals from the first direction to a second direction that is toward a location above the device or below the device; and
   a wedge configured to receive light signals from the port such that the light signals travel through the wedge and then exit the wedge traveling in a third direction, the wedge being configured to change the direction that the light signals travel from the second direction to the third direction, the third direction being toward a location above or below the device and at an angle in a range of 88° to 92° relative to the device.

2. The device of claim 1, wherein the wedge is configured such that the third direction is at an angle in a range of 89° to 91° relative to the device.

3. The device of claim 1, wherein the wedge is configured such that the third direction is at an angle in a range of 89.5° to 90.5° relative to the device.

4. The device of claim 1, wherein the wedge is configured such that the third direction is perpendicular to the device.

5. The device of claim 1, wherein the wedge is configured such that the third direction is at an angle in a range of 88° to 92° relative to a bottom side of the base.

6. The device of claim 1, wherein the wedge is configured such that the third direction is at an angle in a range of 88° to 92° relative to a direction of propagation of the light signal along the waveguide.

7. The device of claim 1, wherein the light signals enter the wedge through a first side of the wedge and exit the wedge through a second side of the wedge, the portion of the second side through which the light signals exit being flat.

8. The device of claim 1, wherein the light signals enter the wedge through a first side of the wedge and exit the wedge through a second side of the wedge, the portion of the second side through which the light signals exit being curved.

9. The device of claim 1, wherein the wedge is configured to correct the light signal for diffraction such that the light signal is collimated after exiting from the wedge.

10. The device of claim 1, wherein the waveguide is configured to guide the light signals through a first light-transmitting medium and the port includes a second light-transmitting medium, the port configured such that light signals traveling through the second light-transmitting medium after the light signals exit the waveguide through the facet, and the second light-transmitting medium being different from the first light-transmitting medium.

11. The device of claim 10, wherein the port includes a reflecting surface configured to reflect the light signals traveling through the port, the light signals traveling through the second light-transmitting medium before being reflected by the reflecting surface.

12. The device of claim 10, wherein the waveguide includes a ridge defined by trenches extending into the first light-transmitting medium on opposing sides of the ridge.

13. A system, comprising:
   a first device that includes a waveguide terminating at a facet,
      the waveguide guiding light signals such that they exit the waveguide through the facet,
      upon the light signals being incident on the facet the light signals traveling in a direction that is parallel to a direction of propagation of light signals in the waveguide,
      the first device including a first wedge through which the light signals are transmitted after exiting the waveguide,
         the first wedge being configured receive the light signals as they are traveling in a second direction,
         the second direction being toward a location that is above or below the first device,
         the first wedge being configured to change the light signals from the second direction to a third direction,
         the third direction being toward a location above or below the device, and
         the third direction being closer to a perpendicular angle than the second direction,
         the perpendicular angle being relative to the first device;
   a second device that includes a second wedge through which the light signals that exit from the first device enter the second device;
   the second direction being at a first angle relative to the first device and at a second angle relative to the second device, the first angle being in a range of 88° to 92° and the second angle being in a range of 88° to 92°.

14. The device of claim 13, wherein the first angle is in a range of 89° to 91° and the second angle is in a range of 89° to 91°.

15. The device of claim 13, wherein the first angle is in a range of 89.5° to 90.5° and the second angle is in a range of 89° to 91°.

16. The device of claim 13, wherein the first angle is perpendicular to the first device and the second angle is perpendicular to the second device.

17. The system of claim 13, wherein the light signals travel directly from the first device to the second device through a fourth light-transmitting medium.

18. The system of claim 17, wherein the fourth light-transmitting medium is the ambient atmosphere in which the first device and the second device are placed.

19. The system of claim 13, wherein one or more alignment structures extend from an alignment opening in the first device to an alignment opening in the second device.

20. The system of claim 13, wherein the first device includes
   a waveguide immobilized on a base;
   a port configured to receive the light signals from the waveguide such that the light signals travel through the port, the light signals entering the port traveling in a first direction and the port being configured to change the direction of the light signals from the first direction to the second direction; and
   the first wedge being configured to receive the light signals from the port such that the light signals travel through the wedge without being reflected back into the wedge.

21. The system of claim 20, wherein the light signals enter the first wedge through a first side of the wedge and exit the first wedge through a second side, the portion of the second side through which the light signals exit being flat.

22. The system of claim 20, wherein the light signals enter the first wedge through a first side of the wedge and exit the wedge through a second side, the portion of the second side through which the light signals exit being curved.

23. The system of claim 22, wherein the first wedge is configured to correct the light signal for diffraction such that the light signal is collimated after exiting from the first wedge.

24. The system of claim 20, wherein the waveguide is configured to guide the light signals through a first light-transmitting medium and the port is configured such that light signals traveling through the port travel through a second light-transmitting medium that is different from the first light-transmitting medium.

25. A method of forming an optical device, comprising:
generating an optical device that includes
a waveguide immobilized on a base and terminating at a facet,
the waveguide guiding light signals such that they exit the waveguide through the facet,
upon the light signals being incident on the facet the light signals traveling in a direction that is parallel to a direction of propagation of light signals in the waveguide, and
a port configured to receive light signals from the waveguide such that the light signals travel through the port, the light signals entering the port traveling in a first direction and the port being configured to change the direction of the light signals from the first direction to a second direction that is toward a location above the device or below the device; and
attaching a wedge to the device such that the wedge receives the light signals from the port and the light signals travel through the wedge and exit the wedge traveling in a third direction, the wedge being configured to change the direction that the light signals travel from the second direction to the third direction, the third direction being at an angle in a range of 88° to 92° relative to the device and that is toward a location above or below the device.

26. The device of claim 10, wherein the wedge includes a third light-transmitting medium through which the light signal travels and the third light-transmitting medium has a different index of refection than the second light-transmitting medium.

27. The device of claim 1, wherein the wedge is included in a piece that is different from a piece that includes the port.

28. The device of claim 1, wherein the port includes a second light transmitting medium that has an interface with the wedge.

29. The device of claim 1, wherein the third direction is closer to a perpendicular angle than the second direction, the perpendicular angle being measured relative to the device.

30. The device of claim 1, wherein the device is configured such that the light signals traveling in the third direction traveled through the wedge without being reflected back through the wedge.

31. The wedge of claim 1, wherein the wedge is a wedge of a single continuous material.

* * * * *